(12) United States Patent
Uchida et al.

(10) Patent No.: US 7,481,686 B2
(45) Date of Patent: Jan. 27, 2009

(54) CONNECTOR

(75) Inventors: Shinji Uchida, Kanagawa (JP);
Kunitoshi Kanazawa, Kanagawa (JP)

(73) Assignee: J.S.T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 11/600,054

(22) Filed: Nov. 16, 2006

(65) Prior Publication Data

US 2007/0117473 A1    May 24, 2007

(30) Foreign Application Priority Data

Nov. 24, 2005 (JP) ............................. 2005-339292

(51) Int. Cl.
*H01R 4/48* (2006.01)

(52) U.S. Cl. ...................... 439/862; 439/630

(58) Field of Classification Search ................. 439/630, 439/862
See application file for complete search history.

(56) References Cited

U.S. PATENT DOCUMENTS

| | | | | |
|---|---|---|---|---|
| 5,082,452 A | * | 1/1992 | Takano | 439/206 |
| 5,259,777 A | * | 11/1993 | Schuder et al. | 439/188 |
| 5,997,315 A | * | 12/1999 | Akama et al. | 439/66 |
| 6,000,969 A | * | 12/1999 | Reichardt et al. | 439/630 |
| 6,129,558 A | * | 10/2000 | Kihira et al. | 439/66 |
| 6,280,254 B1 | * | 8/2001 | Wu et al. | 439/630 |
| 6,398,598 B2 | * | 6/2002 | Masumoto | 439/862 |
| 6,447,338 B1 | * | 9/2002 | Bricaud et al. | 439/630 |
| 6,454,607 B2 | * | 9/2002 | Bricaud | 439/630 |
| 6,471,550 B2 | * | 10/2002 | Maiterth et al. | 439/631 |
| 6,719,594 B1 | * | 4/2004 | Yuzawa | 439/862 |
| D491,893 S | * | 6/2004 | Chen | D13/147 |
| 6,994,566 B2 | * | 2/2006 | You | 439/66 |
| 2001/0034162 A1 | * | 10/2001 | Annaler et al. | 439/630 |

FOREIGN PATENT DOCUMENTS

| | | |
|---|---|---|
| JP | 11-233185 A | 8/1999 |
| JP | 2000-036349 A | 2/2000 |
| JP | 2002-359038 A | 12/2002 |
| JP | 2003-257529 A | 9/2003 |

* cited by examiner

*Primary Examiner*—Tho D Ta
*Assistant Examiner*—Travis Chambers
(74) *Attorney, Agent, or Firm*—Rader, Fishman & Grauer, PLLC

(57) ABSTRACT

A connector for an IC card is provided which has a reduced height and in which self-correction is possible. The connector includes a plurality of cantilever contacts electrically connected to an IC card, each including a stationary arm and a resilient arm having a tip formed with a contact point. The connector also includes a housing holding the contacts and integrally formed with the stationary arm so that the contact point projects from one surface of the housing. The resilient arms are bendably arranged in parallel and are slidable with respect to the IC card inserted from any one of the first and second insertion directions.

10 Claims, 9 Drawing Sheets

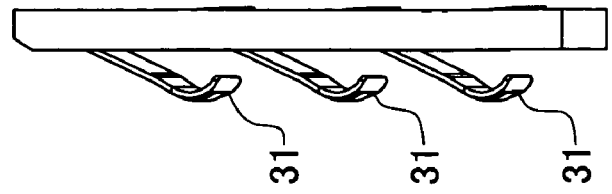
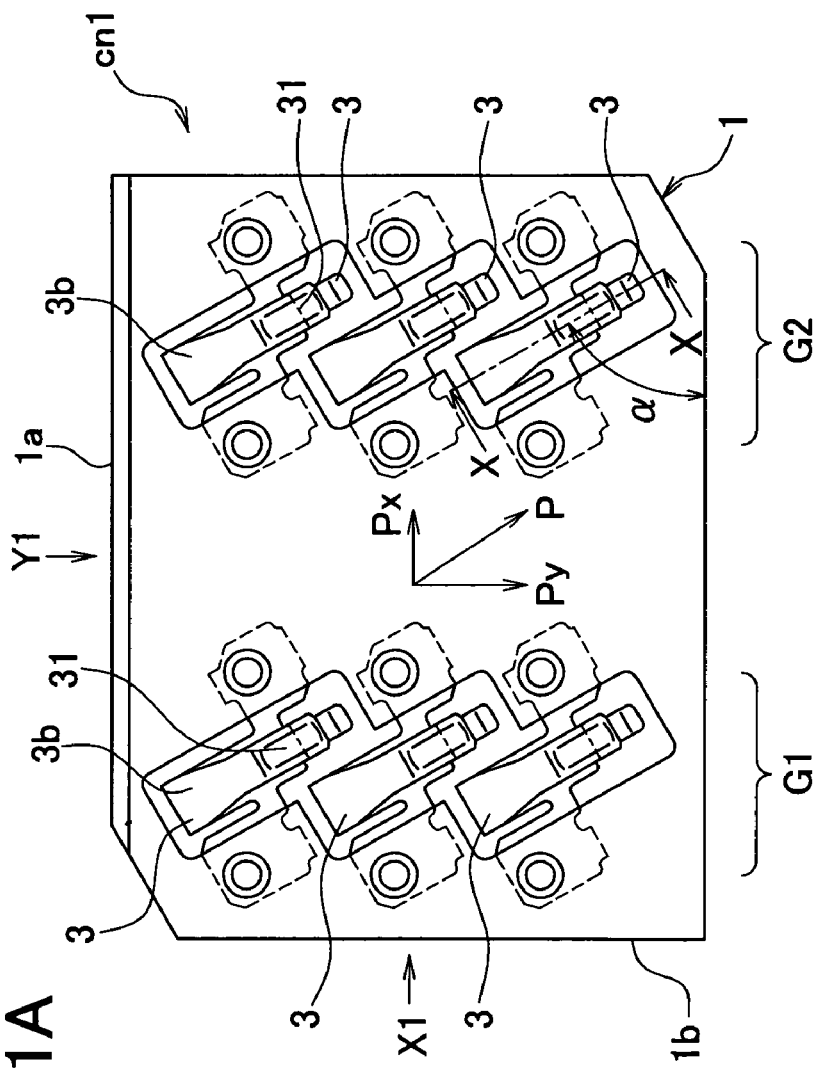
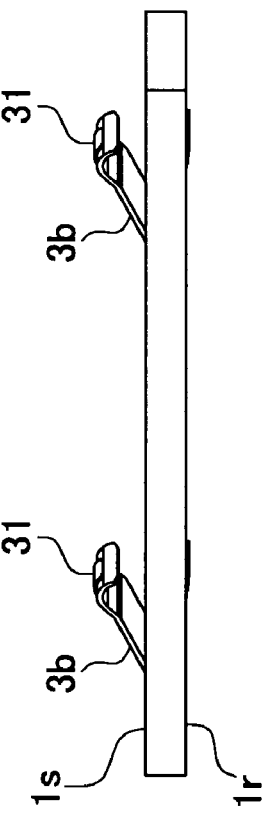

CONNECTOR

This application is based on and claims the benefit of priority from Japanese Patent Application No. 2005-339392, filed on Nov. 24, 2005, the content of which is incorporated herein by reference.

BACKGROUND OF THE INVENTION

1. Field of the Invention

The present invention relates to connectors for electrical connections, and more particularly, to structures of connectors for SIM (Subscriber Identify Module) cards used in cellular phones and the like.

2. Related Art

In recent years, cellular phones in which an SIM card can be installed have come into wide use. The SIM card is an IC card issued by a telephone enterprise with contractor information recorded thereon. The SIM card serves to identify a user through insertion into a cellular phone. For example, by installing an SIM card in a cellular phone after purchasing it, the user can start to use the SIM card immediately. Moreover, by SIM card replacement, the user can use another cellular phone with the same telephone number. Furthermore, the user can freely use a plurality of SIM cards with the same cellular phone.

As one example of connectors for such SIM cards, Japanese Unexamined patent application Publication No. 2003-257529 (referred to hereafter as Patent Document 1) discloses a multi-direction insertion connector for receiving an SIM card from at least two different directions, wherein the connector includes a plurality of contacts in which a punching die clearance between adjacent contacts can be made large in the pressing process without changing reception size for insertion of the SIM card.

FIGS. 9A to 9C are views showing a configuration of a connector in a first embodiment of Patent Document 1, wherein FIG. 9A is a plan view, FIG. 9B is a view taken along the line X-X in FIG. 9A, and FIG. 9C is a right side view of FIG. 9A. FIG. 9 of the application corresponds to FIG. 2 of Patent Document 1. FIG. 10 is a perspective external view showing a contact used for a connector in a second embodiment of Patent Document 1. FIG. 10 of the application corresponds to FIG. 6 of Patent Document 1.

Referring to FIGS. 9A to 9C, a connector 80 includes a plurality of contacts 82 and a housing 81 for holding the contacts 82. Each contact 82 is formed with a contact part 83 that makes contact with an SIM card, not shown. The housing 81 holds the contact 82 so that the contact part 83 projects from a first surface 8a. The SIM card, not shown, is inserted into the connector 80 from a first card-insertion direction Y1 corresponding to the pitch direction along which the contacts 82 are arranged in parallel and a second card-insertion direction X1 orthogonal to the first card-insertion direction Y1.

Referring to FIGS. 9A to 9C, each contact part 83 includes a first guiding part 85 arranged on the side of the first card-insertion direction Y1 for guiding insertion of the SIM card and a second guiding part 86 arranged on the side of the second card-insertion direction X1 for guiding the SIM card. The contact part 83 is formed roughly in a T-shape. The first and second guiding parts 85 and 86 each are configured to have at least part receding from the first surface 8a of the housing 81.

Referring to FIG. 10, a contact 92 is formed by bending an elongated resilient metal plate in roughly an S-shape, and includes a contact part 83 having a tip shaped such that the circular top is half removed. The contact part 83 includes first and third guiding parts 85 and 87 arranged symmetrically and extending from the top obliquely downwardly with respect to both sides of the contact 92. The first and third guiding parts 85 and 87 have a tip bent and facing downward, and are formed roughly in a T-shape.

Referring to FIG. 10, the contact 92 includes a spring part 88, a holding part 89, a soldering part 90, and an engaging part 91. The spring part 88 extends from the contact part 83 inwards, obliquely and downwards to extend to the interior of the top face of the housing 81 (refer to FIG. 9B). The spring part 88 bends so as to be parallel to the top face of the housing 81, extends inwardly, and makes a U-turn so as to form a U-shape, extending to the outside of the housing 81 along the top face of the housing 81. The holding part 89 is arranged at a tip of the spring part 88 to bend downward therefrom so as to extend downward along the side face of the housing 81, reaching a lower end of the housing 81. The holding part 89 is press-fit into a mounting groove 81a (refer to FIG. 9C) of the housing 81. The soldering part 90 is arranged at a lower end of the holding part 89 to bend therefrom so as to extend outwardly. The soldering part 90 is soldered to a printed circuit board, not shown. The engaging part 91 is engaged with an insertion groove of the housing 81.

The connector including a plurality of contacts 92 shown in FIG. 10 can receive an SIM card, not shown, from the first card-insertion direction Y1 corresponding to the pitch direction along which the contacts 92 are arranged in parallel and a third card-insertion direction Y2 opposite the first card-insertion direction Y1.

As shown in FIG. 10, the contact 92 including first and third guiding parts 85 and 87 that extend from the top (i.e., referred to as a contact point) of the contact part 83 obliquely and downward is advantageous for insertion of an SIM card from multiple directions. However, the contact 92 causes a problem in that a mounting height H with respect to the housing 81 is increased due to restriction of the guiding parts 85 and 87. That is, in order for the contact part 83 to secure a given amount of curvature, a predetermined clearance needs to be arranged between the tip of the first and third guiding parts 85 and 87 and the holding part 89.

For example, there is a demand for further reduction in weight and thickness in cellular phones in which an SIM card can be installed. However, the contact including card-guiding parts as shown in FIGS. 9A to 10 has a fixed limit to reduction in the mounting height of the connector. Thus, there is a demand for height reduction in connectors into which an SIM card is slidably inserted. Preferably, the connections are of the self-correction type having a so-called self-alignment effect, wherein the inclined position of the SIM card is corrected in accordance with insertion thereof. Realization of a configuration for such connectors is a problem to be solved by the invention.

SUMMARY OF THE INVENTION

The present invention has been made in view of this type of problem, and aims to provide a connector into which an IC card is slidably inserted, wherein the connector has a reduced height and is of the self-correction type.

The inventors have found that height reduction and self-correction of the connector can be achieved using a cantilever contact, the cantilever contact being provided to a housing so that the direction of extension of a free end of the cantilever intersects the direction of insertion of an IC card at an acute angle. On the basis of this finding, the inventors have devised the following new connector.

According to a first aspect of the present invention, a connector is provided that includes: a plurality of cantilever contacts electrically connected to connection terminals of an IC card, each cantilever contact being composed of a plate-like contact, each cantilever contact including a stationary arm and a resilient arm having a tip formed with a circular contact point, the stationary arm and the resilient arm being connected at base ends to present an approximate V-shape; and an approximately rectangular plate-like housing that holds the cantilever contacts, the housing being integrally formed with the stationary arm so that the contact point projects from a first surface of the housing, wherein a direction extending from a base end of the resilient arm to the contact point obliquely intersects a first insertion direction along which the IC card is inserted from a first side of the housing and a second insertion direction, orthogonal and adjacent to the first side, along which the IC card is inserted from a second side of the housing, wherein the resilient arms are bendably arranged in parallel and slidable with respect to the IC card inserted from any one of the first and second insertion directions.

The connector according to the first aspect of the present invention includes a plurality of cantilever contacts and a substantially rectangular plate-like housing. The cantilever contacts are electrically connected to connection terminals of an IC card. The housing holds the cantilever contacts.

Each cantilever contact is configured so that a cantilever serves the same function as that of a spring, and has a conductivity, the desired shape of which can be obtained by forming a conductive metal plate. On the other hand, the housing is insulating. The insulative housing may be a housing formed of a non-conductive material, the substantially rectangular shape of which can be obtained by molding an engineering plastic.

For example, the IC card, also referred to as a chip card, includes an SIM card as will be described later. The IC card chip includes an IC chip accommodated in an insulative plastic casing. The IC chip is connected to a plurality of metal foils stuck on the surface of the casing. The plurality of metal foils serve as connection terminals of the IC card. The feature that the cantilever contacts are electrically connected to connection terminals of the IC card may make contact points, as will be described later, bias and make contact with the connection terminals to achieve electrical connection. The feature that the housing holds the cantilever contacts may cause stationary arms, as will be described later, to be held by the housing, and may include both cases in which all of the stationary arms are held and cases in which part of the stationary arms is held.

The connector according to the first aspect of the present invention is configured so that the cantilever contact is composed of a plate-like contact and includes a stationary arm and a resilient arm. The resilient arm has a tip formed with a circular contact point. The stationary arm and resilient arm are connected at base ends to present a substantially V-shape. The housing is integrally formed with the stationary arm so that the contact point projects from one surface of the housing.

The resilient arm is formed as an elongate strip, and has a tip formed as a gently curving circular arc. The stationary arm may include a pair of jutting parts as will be described later, and may have a tip formed with a soldering part. The feature that the stationary arm and resilient arm are connected to present a substantially V-shape may cause the resilient arm to be obliquely arranged with respect to the stationary arm, wherein the cantilever contact serves as a cantilever, with the base end of the resilient arm being supported so that a load acts on the tip thereof. Preferably, the stationary arm and resilient arm are connected at the base ends to present a circular shape, by which stress concentration due to a load acting on the resilient arm can be alleviated.

The feature that the contact point projects from one surface of the housing may make part of the resilient arm project from one surface of the housing, wherein the IC card is inserted parallel to the one surface. The feature that the housing is integrally formed with the stationary arm may mean that part of the stationary arm is molded to the housing, which is achieved using a pair of jutting parts as will be described later.

The connector according to the first aspect of the present invention is configured so that a direction extending from a base end of the resilient arm to the contact point obliquely intersects a first insertion direction, along which the IC card is inserted from a first side of the housing, and a second insertion direction, along which the IC card is inserted from a second side of the housing. Moreover, the resilient arms are bendably arranged in parallel and slidably with respect to the IC card inserted from any one of the first and second insertion directions.

The resilient arm makes contact with a connection terminal of the IC card inserted from the first side of the housing, so that a force P acts on the resilient arm in accordance with an angle of inclination thereof. Of the force P, a horizontal component Px is operative in the second insertion direction orthogonal to the first insertion direction. By arranging a stop wall on the side opposite the direction along which the horizontal component Px is operative, while slidably moving along the stop wall, the IC card can be inserted by a force greater than a vertical component Py of the force P. That is, the inclined position of the IC card can be corrected in accordance with insertion thereof.

Likewise, the resilient arm makes contact with a connection terminal of the IC card inserted from the second side of the housing, so that force P acts on the resilient arm in accordance with an angle of inclination thereof. Of the force P, vertical component Py is operative in the first insertion direction orthogonal to the second insertion direction. By arranging a stop wall on the side opposite the direction along which the vertical component Py is operative, while slidably moving along the stop wall, the IC card can be inserted by a force greater than the horizontal component Px of the force P. That is, the inclined position of the IC card can be corrected in accordance with insertion thereof.

If the direction extending from the base end of the resilient arm to the contact point is set to intersect the first insertion direction at 45 degrees, for example, the IC card is easily inserted from any one of the first and second insertion directions. That is, the IC card is easily inserted from two different directions. The connector according to the first aspect of the present invention includes no guiding parts that are required in the related art, resulting in possible height reduction.

According to a second aspect of the present invention, there is provided a connector, including: a plurality of cantilever contacts electrically connected to connection terminals of an IC card, each cantilever contact being composed of a plate-like contact, each cantilever contact including a stationary arm and a resilient arm having a tip formed with a circular contact point, the stationary arm and the resilient arm being connected at base ends to present an approximate V-shape; and an approximately rectangular plate-like housing that holds the cantilever contacts, the housing being integrally formed with the stationary arm so that the contact point projects from a first surface of the housing, wherein the plurality of cantilever contacts are divided into first and second groups, the first and second groups being arranged oppositely, wherein, in the first and second groups, directions extending from a base end of the resilient arm to the contact point obliquely intersect a first insertion direction along which the IC card is inserted from a first side of the housing so that the first insertion direction forms a bisector, wherein the resilient arms are bendably arranged in parallel and slidable with respect to the IC card inserted from the first insertion direction.

The connector according to the second aspect of the present invention is configured so that the plurality of cantilever contacts are divided into first and second groups, the first and second groups being arranged oppositely. In the first and second groups, directions extending from a base end of the resilient arm to the contact point obliquely intersect a first insertion direction along which the IC card is inserted from a first side of the housing so that the first insertion direction forms a bisector. Moreover, the resilient arms are bendably arranged in parallel and slidable with respect to the IC card inserted from the first insertion direction.

For example, two groups of three cantilever contacts are arranged as first group and second group, respectively. The feature that, in the first and second groups, directions extending from a base end of the resilient arm to the contact point obliquely intersect a first insertion direction along which the IC card is inserted from a first side of the housing so that the first insertion direction forms a bisector, may mean that the paired right and left resilient arms are arranged roughly as a funnel shape as viewed in section, by which the IC card inserted from the first side of the housing slidably moves while making contact with the resilient arms, and its included position can be corrected.

According to a third aspect of the present invention, the plurality of cantilever contacts each include a pair of jutting parts projecting from both wings of the stationary arm, the jutting parts being integrally formed with the housing.

For example, the pair of jutting parts may be formed with respective positioning holes. The pair of holes is engaged with a pair of bosses provided to the housing, positioning the cantilever contact. The pair of jutting parts are integrally formed with, and fixed to, the housing.

According to a fourth aspect of the present invention, the plurality of cantilever contacts each include a soldering part for soldering to a printed circuit board, the soldering part being arranged at a tip of the stationary arm, and the soldering part being arranged to project from a second surface of the housing.

According to a fifth aspect of the present invention, the housing is formed with a compartment for accommodating part of each cantilever contact.

The compartment may be a through hole that opens to one and the other surfaces of the housing, wherein adjacent compartments may communicate with each other. Part of the cantilever contact can include stationary arm and sections of the resilient arm outside of the section projecting from one surface of the housing. The feature of accommodating part of the cantilever contact may mean that part of the cantilever contact is arranged in the compartment by insertion, holding, storage, etc.

According to a sixth aspect of the present invention, the IC card includes an SIM card.

With the connector according to the present invention, the cantilever contact is provided to a housing so that the direction of extension of a free end of the cantilever intersects the direction of insertion of an IC card at an acute angle. Thus, while slidably making contact with the cantilever contacts, the IC card can be corrected in its inclined position in accordance with insertion thereof. If the direction of extension of the free end is inclined at 45 degrees, the IC card can be inserted from two difference directions. The connector according to the present invention includes no guiding parts, which are required in the related art, resulting in possible height reduction.

BRIEF DESCRIPTION OF THE DRAWINGS

FIGS. 1A to 1C are views showing a configuration of a first embodiment of a connector according to the present invention;

DETAILED DESCRIPTION OF THE INVENTION

Figure 2:
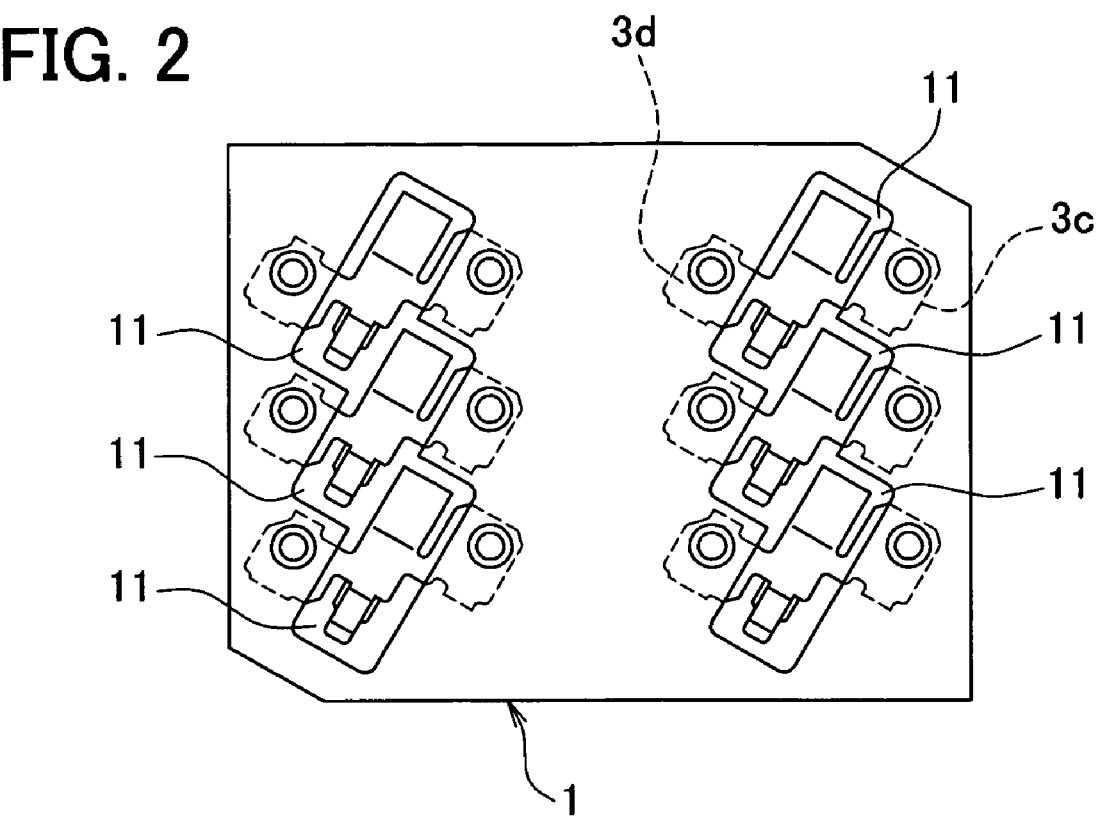
FIG. 2 is a rear view showing the connector in the first embodiment.

Referring to the drawings, the best mode for carrying out the invention is described hereafter.

Figure 3:
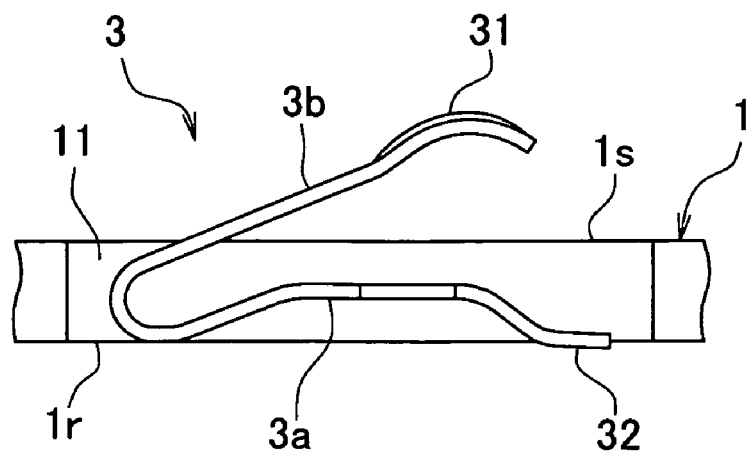
FIG. 3 is a longitudinal sectional view of a cantilever contact according to the present invention, taken along the line X-X in FIG. 1.
Figure 4:
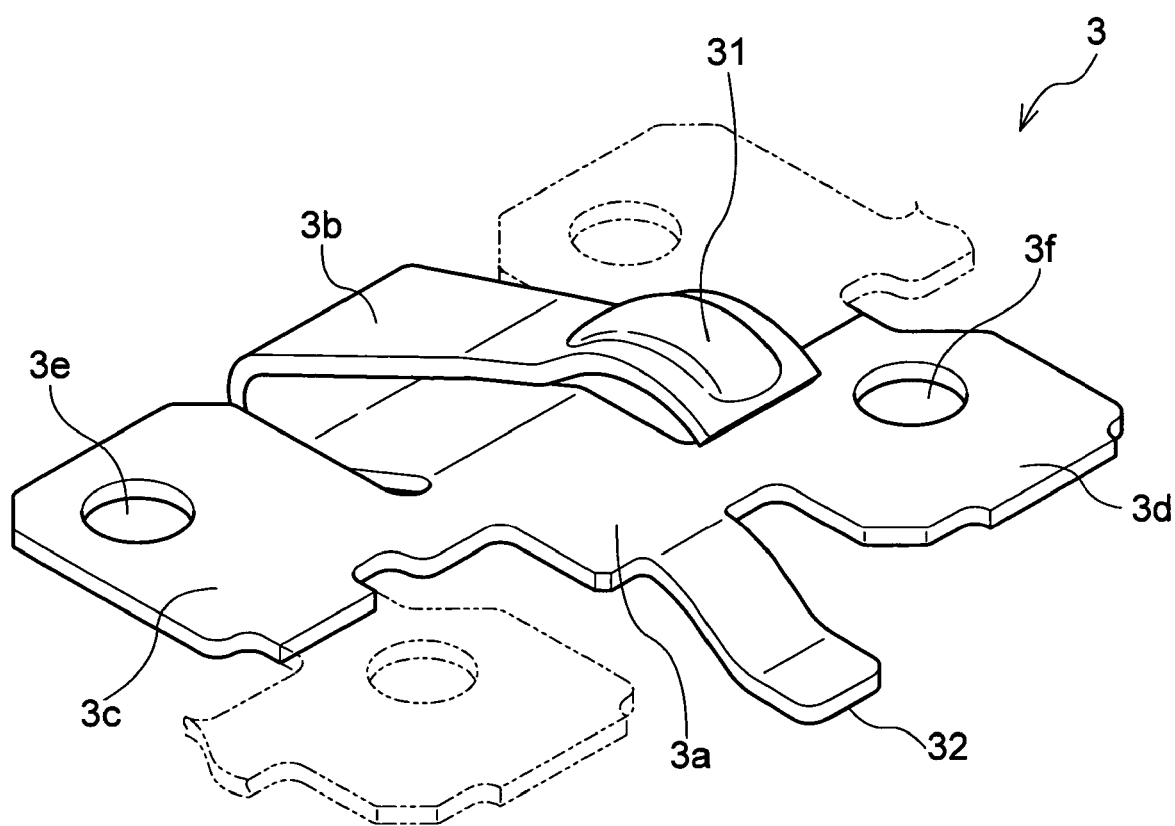
FIG. 4 is a perspective external view showing an embodiment of the cantilever contact according to the present invention.
Figure 5A:
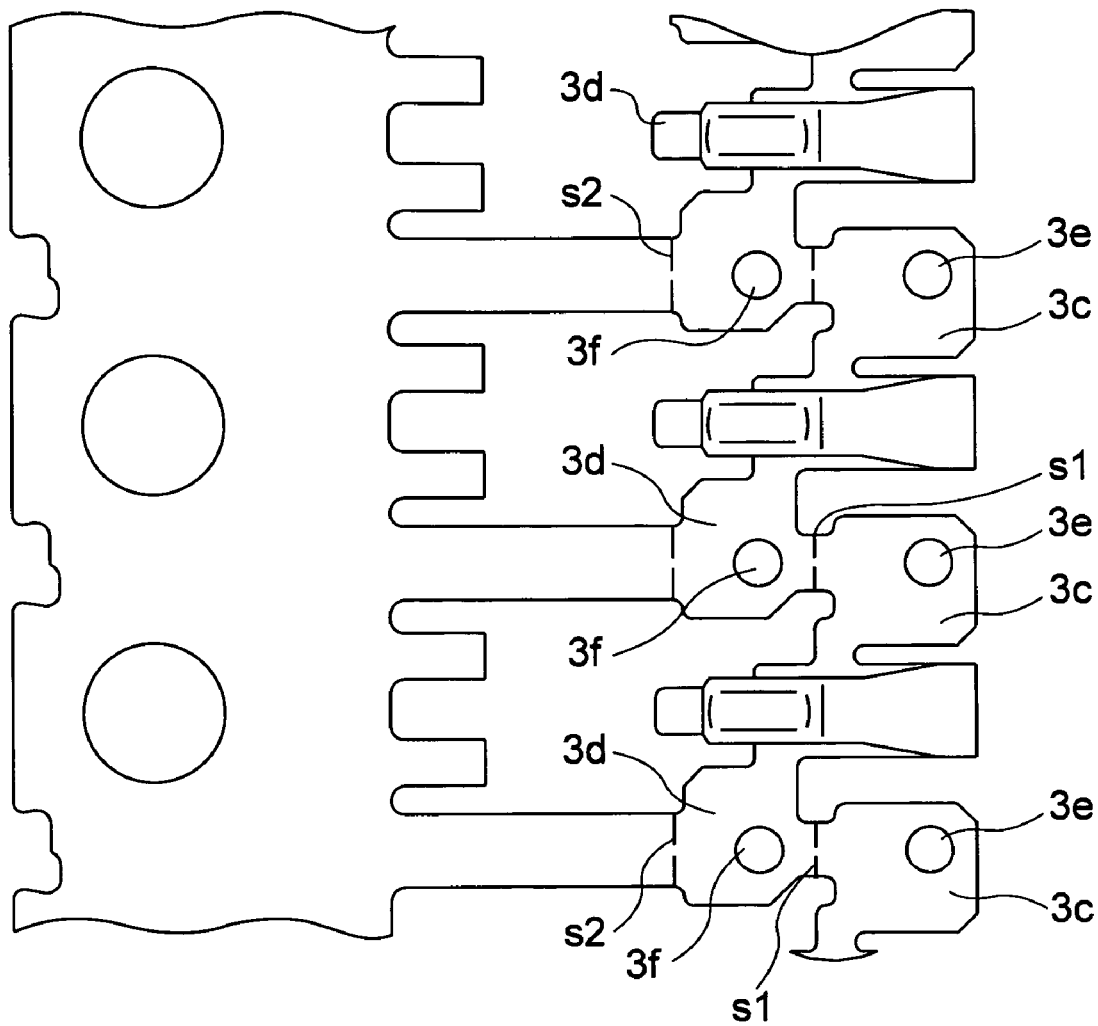
FIGS. 5A and 5B are views showing a plurality of cantilever contacts in the embodiment, which are formed together.
Figure 5B:
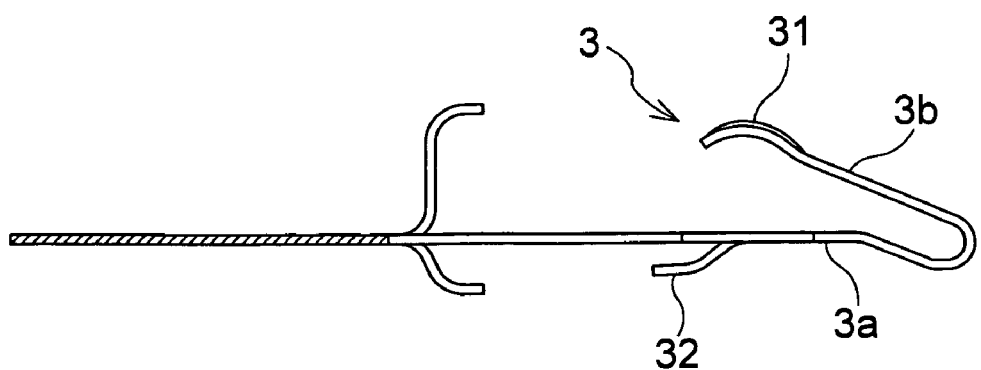

FIGS. 1A to 1C are views showing a configuration of a first embodiment of a connector according to the present invention, wherein FIG. 1A is a plan view, FIG. 1B is a front view, and FIG. 1C is a right side view. FIG. 2 is a rear view showing the connector in the first embodiment. FIG. 3 is a longitudinal sectional view of a cantilever contact according to the present invention, taken along the line X-X in FIG. 1. FIG. 4 is a perspective external view showing an embodiment of the cantilever contact according to the present invention. FIGS. 5A and 5B are views showing a plurality of cantilever contacts in the embodiment, which are formed together, wherein FIG. 5A is a plan view, and FIG. 5B is a front view.

Figure 6:
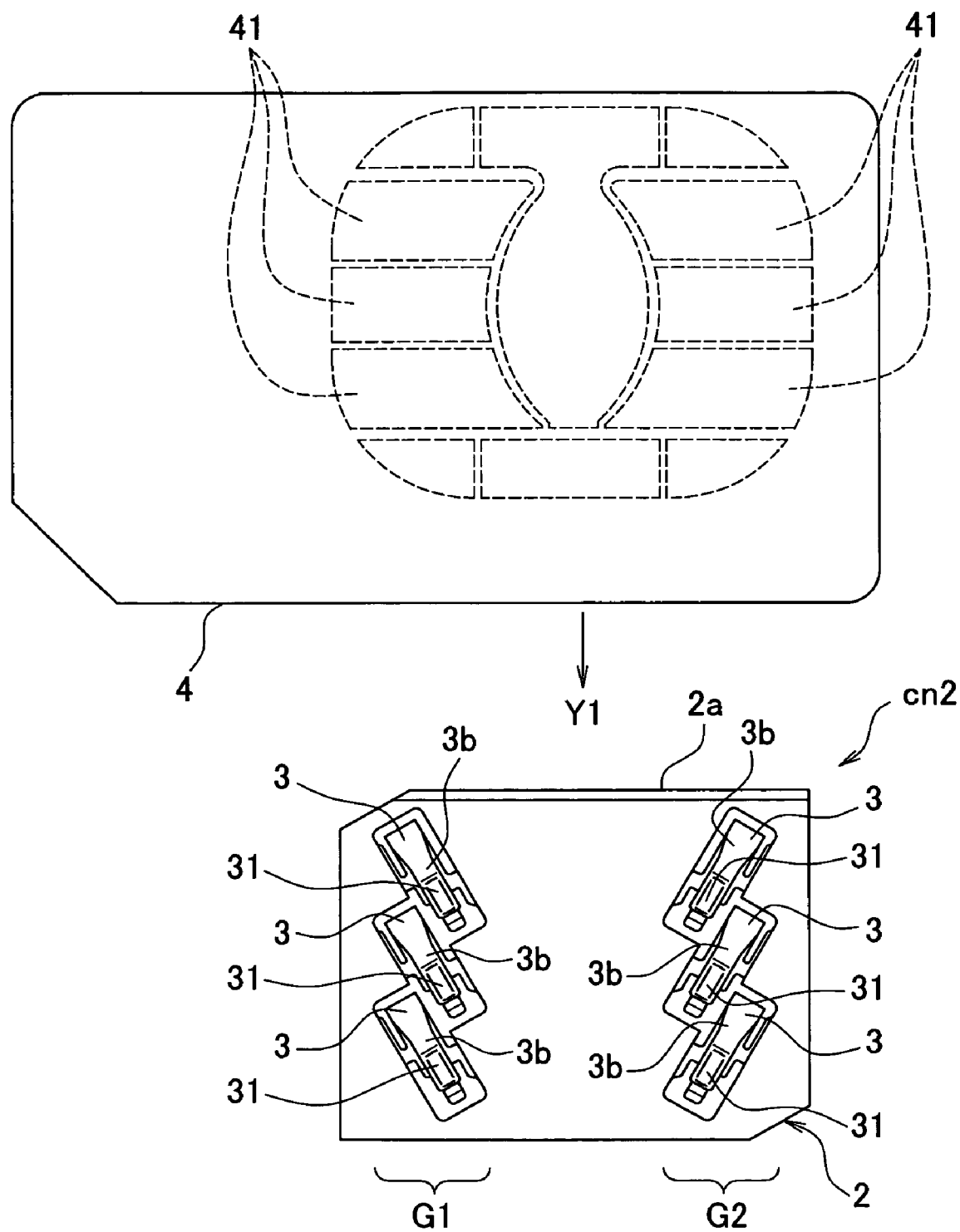
FIG. 6 is a plan view showing a configuration of a second embodiment of a connector according to the present invention.
Figure 7:
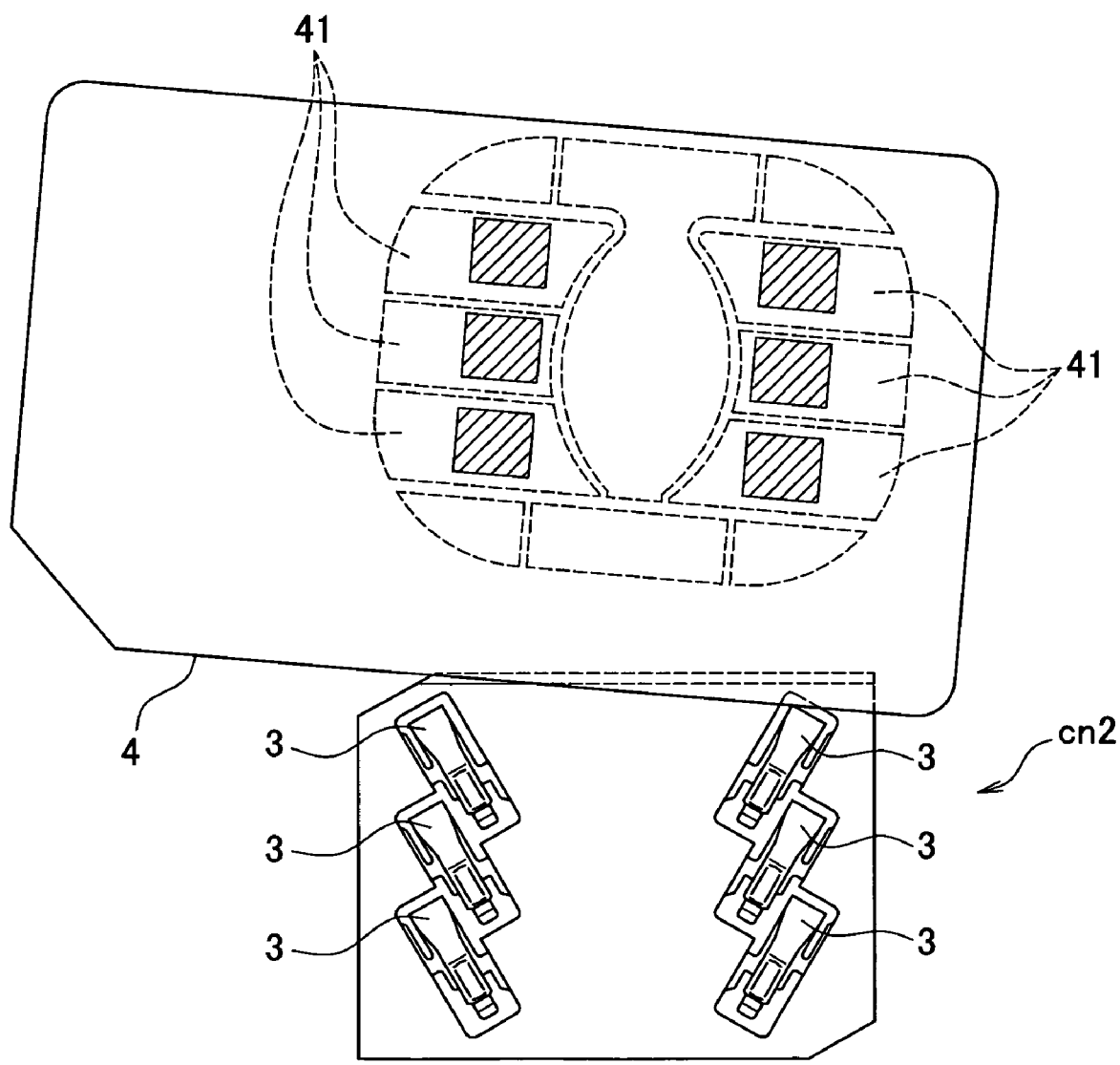
FIG. 7 is a plan view showing a state in which an SIM card is being inserted into the connector in the second embodiment, with the right side inclined upwardly with respect to the connector.
Figure 8:
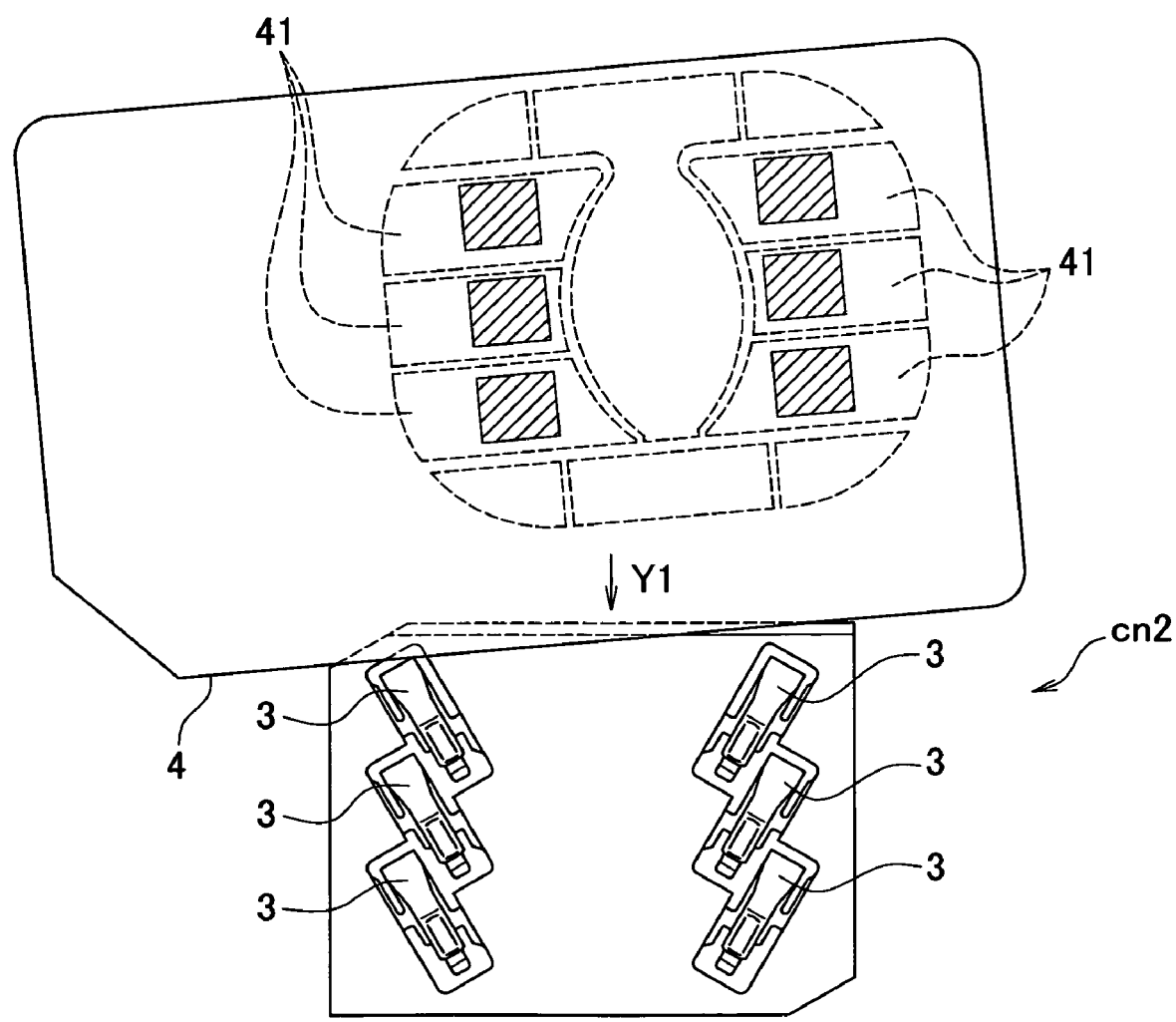
FIG. 8 is a plan view showing a state in which an SIM card is being inserted into the connector in the second embodiment, with the left side inclined upwardly with respect to the connector.
Figure 9A:
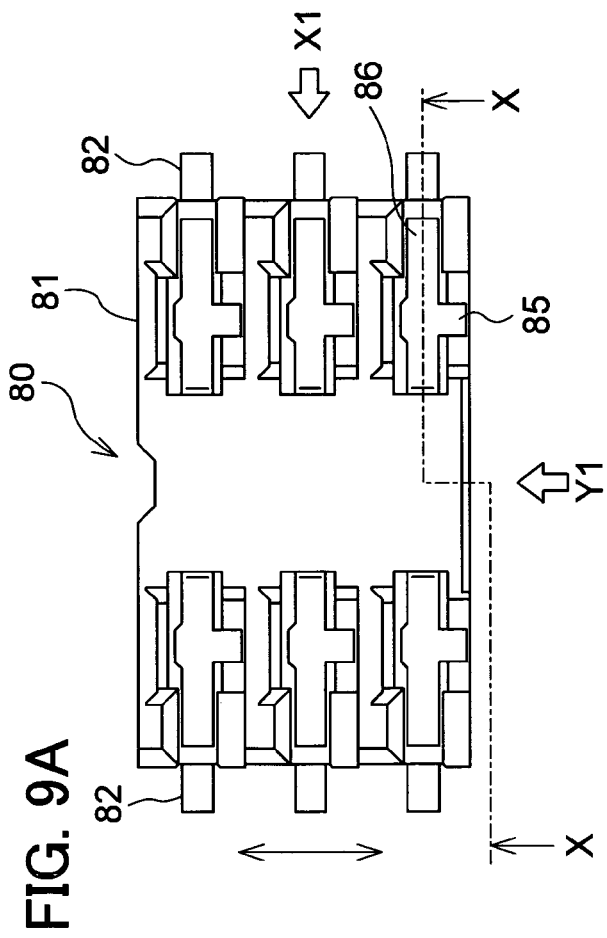
FIGS. 9A to 9C are views showing a configuration of a first embodiment of a connector in the related art.
Figure 9C:
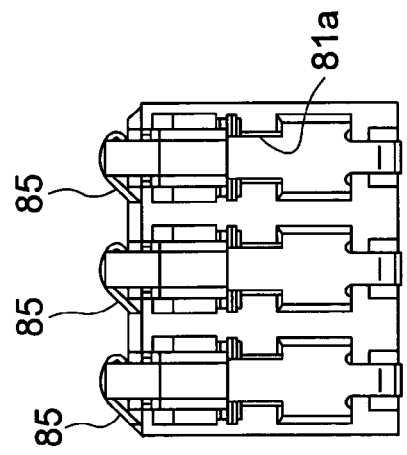
Figure 9B:
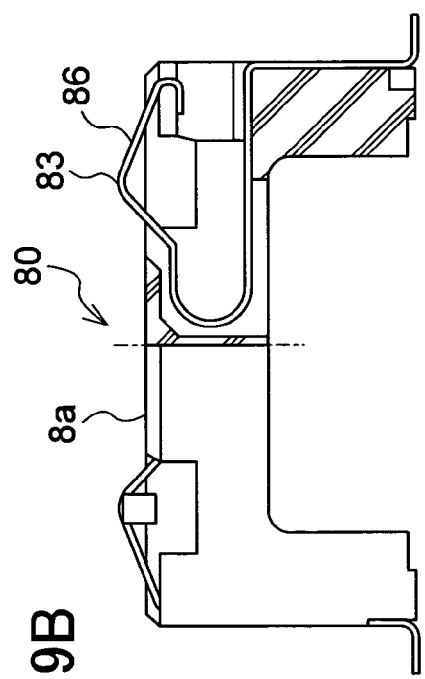
Figure 10:
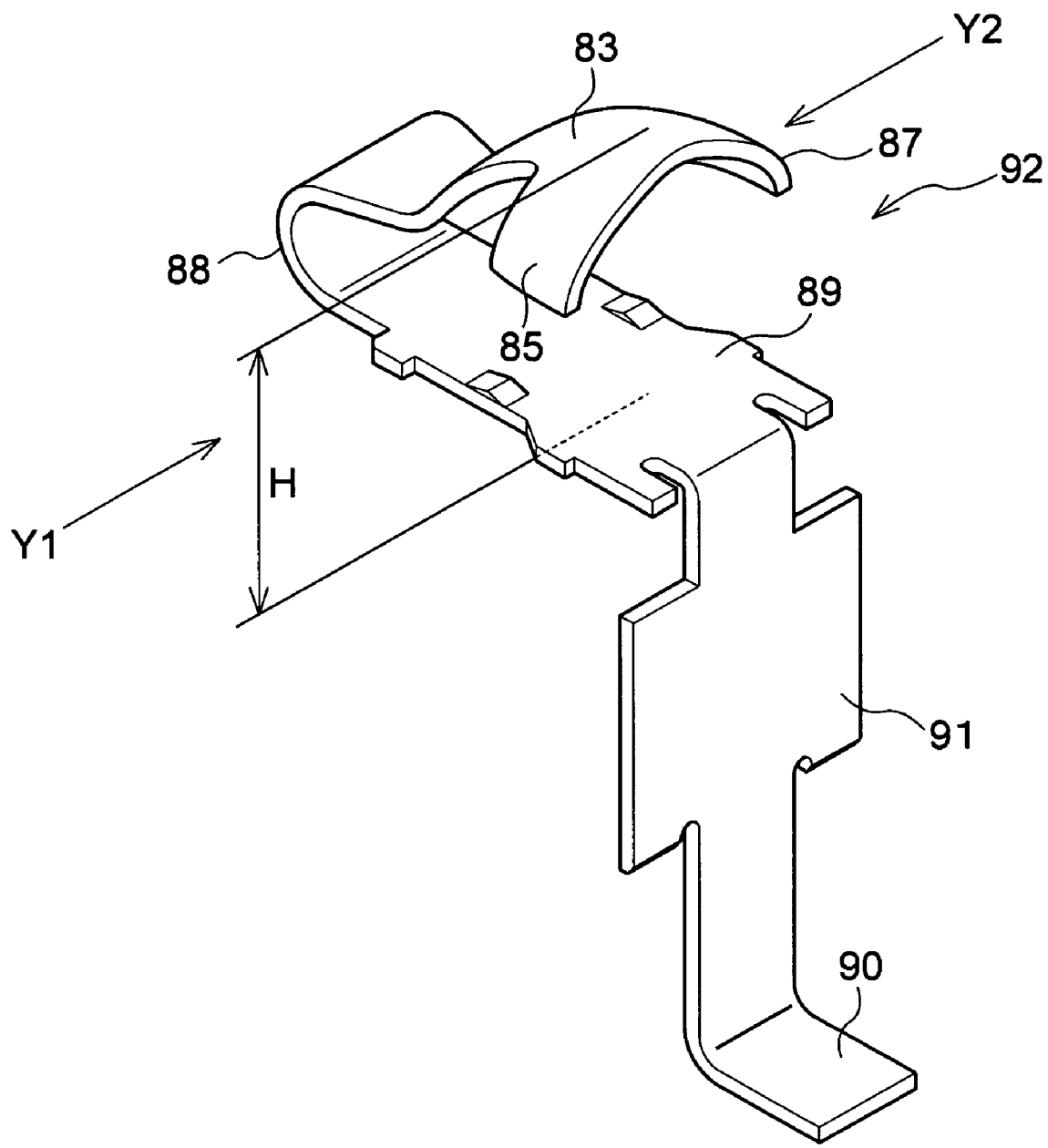
FIG. 10 is a perspective external view showing a contact used in a connector in a second embodiment of the related art.

FIG. 6 is a plan view showing a configuration of a second embodiment of a connector according to the present invention. FIG. 7 is a plan view showing a state in which an SIM card is being inserted into the connector in the second embodiment, with the right side inclined upwardly with respect to the connector. FIG. 8 is a plan view showing a state in which an SIM card is being inserted into the connector in the second embodiment, with the left side inclined upwardly with respect to the connector.

First, a description is made about the configuration of the first embodiment of a connector according to the present invention. Referring to FIG. 1A, a connector cn1 includes a plurality of cantilever contacts (referred to hereafter simply as contacts) 3 and a substantially rectangular plate-like housing 1. Each contact 3 is configured so that a cantilever serves the same function as that of a spring, and is formed of a conductive metal plate. The housing 1 is obtained by molding an insulating engineering plastic.

Referring to FIG. 3, the contact 3 is composed of a plate-like contact, and includes a stationary arm 3a and a resilient arm 3b. The resilient arm 3b has a tip formed with a circular contact point 31. The stationary arm 3a and resilient arm 3b are connected at the base ends to provide a substantially V-shape. The housing 1 is integrally formed with the stationary arm 3a so that the contact point 31 projects from a first surface is of the housing 1.

Referring to FIG. 3 or 4, the resilient arm 3b is formed in an elongate strip, and has a tip formed as a gently curving arc. The stationary arm 3a includes a pair of jutting parts 3c and 3d, and has a tip formed with a soldering part 32. The resilient arm 3b is obliquely arranged with respect to the stationary arm 3a. The contact 3 serves as a cantilever with the base end of the resilient arm 3b being supported so that a load acts on the tip thereof. The stationary arm 3a and resilient arm 3b are connected at the base ends to present a circular shape.

Referring to FIG. 1B, part of the resilient arm 3b, including contact point 31, projects from the first surface is of the housing 1. An SIM card 4 is inserted into the housing 1 parallel to the first surface is (refer to FIG. 6). The contact 3 is molded to the housing 1 using the pair of jutting parts 3c and 3d (refer to FIG. 2).

Referring to FIG. 4, the pair of jutting parts 3c and 3d are formed with respective positioning holes 3e and 3f. The pair of holes 3e and 3f are engaged with a pair of bosses, not shown, provided to the housing 1, positioning the contact 3. The pair of jutting parts 3c and 3d are integrally formed with and fixed to the housing 1 (refer to FIG. 2).

Referring to FIG. 3, the contact 3 includes at the tip of the stationary arm 3a a soldering part 32 for soldering to a printed circuit board, not shown. The soldering part 32 is arranged to project from another or second surface 1r of the housing 1. The housing 1 is formed with a compartment 11 for accommodating the contact 3. The compartment 11 is a through hole that opens to the first and second surfaces 1s and 1r of the housing 1, wherein adjacent compartments 11 communicate with each other (refer to FIG. 2).

Referring to FIG. 5A, the plurality of contacts 3 is formed together by stamping, bending, and drawing a developed metal plate. The continuous contacts 3 are separated along lines s1 and s2 and assembled in the housing 1 (refer to FIG. 1A).

Next, the operation of the connector 3 in the first embodiment is described. Referring to FIG. 1A, the direction extending from the base end of the resilient arm 3b to the contact point 31 obliquely intersects a first insertion direction Y1 along which the SIM card 4 is inserted from a first side 1a of the housing 1 (refer to FIG. 7) and a second insertion direction X1 along which the SIM card 4 is inserted from a second side 1b adjacent and orthogonal to the first side 1a. Moreover, the resilient arms 3b are bendably arranged in parallel and slidable with respect to the SIM card 4 inserted from any one of the first and second insertion directions Y1 and X1.

Referring to FIG. 1A, two groups of three contacts 3 are arranged as first group G1 and second group G2, respectively. Referring to FIG. 1A, the six contacts 3 are the same in the direction extending from the base end of the resilient arm 3b to the contact point 31.

Referring to FIG. 1A, the resilient arm 3b makes contact with a connection terminal of the SIM card 4 inserted from the first side 1a of the housing 1, so that a force P acts on the resilient arm 3b in accordance with an angle of inclination thereof. Of the force P, a horizontal component Px is operative in the second insertion direction X1 orthogonal to the first insertion direction Y1. By arranging a stop wall, not shown, on the side opposite the direction along which the horizontal component Px is operative, while slidably moving along the stop wall, the SIM card 4 can be inserted by a force greater than a vertical component Py of the force P. That is, the inclined position of the SIM card 4 can be corrected in accordance with insertion thereof.

Likewise, the resilient arm 3b makes contact with a connection terminal of the SIM card 4 inserted from the second side 1b of the housing 1, so that force P acts on the resilient arm 3b in accordance with an angle of inclination thereof. Of the force P, a vertical component Py is operative in the first insertion direction Y1 orthogonal to the second insertion direction X1. By arranging a stop wall, not shown, on the side opposite the direction along which the vertical component Py is operative, while slidably moving along the stop wall, the SIM card 4 can be inserted by a force greater than the horizontal component Px of the force P. That is, the inclined position of the SIM card 4 can be corrected in accordance with insertion thereof.

Referring to FIG. 1A, in order to insert the SIM card 4 from the first side 1a, an angle of intersection α between the first side 1a and the direction extending from the base end of the resilient arm 3b to the contact point 31 is preferably about 60 degrees. In order to insert the SIM card 4 from the second side 1a, the angle of intersection α is preferably about 30 degrees. If the angle of intersection α is set at 45 degrees, the SIM card 4 is easily inserted from any one of the first and second insertion directions Y1 and X1. That is, the SIM card 4 is easily inserted from two different directions. The connector according to the present invention includes no guiding parts that are required in the related art, resulting in possible height reduction.

Next, a description is given about the configuration of the second embodiment of a connector according to the present invention. Referring to FIG. 6, a connector cn2 includes a plurality of contacts 3 and a substantially plate-like housing 2. Since the connector cn2 in the second embodiment differs from the connector cn1 in the first embodiment merely in arrangement of the contacts with respect to the housing, an repeated description is omitted below.

Referring to FIG. 6, the SIM card 4 includes an IC chip accommodated in an insulating plastic casing. The IC chip is connected to a plurality of metal foils stuck on the surface of the casing. The plurality of metal foils serve as connection terminals 41 of the SIM card 4. Referring to FIG. 6, the six connection terminals 41 are electrically connected to the contact points 31.

Referring to FIG. 6, the housing 2 is integrally formed with the stationary arm 3a so that the contact point 31 projects from a first surface of the housing 2 (refer to FIG. 3). The plurality of contacts 3 is divided into first group G1 and second group G2, which are arranged oppositely. In the first and second groups G1 and G2, the directions extending from the base end of the resilient arm 3b to the contact point 31 obliquely intersect the first insertion direction Y1 along which the SIM card 4 is inserted from a first side 2a of the housing 2, so that the first insertion direction Y1 forms a bisector. Moreover, the resilient arms 3b are bendably arranged in parallel and slidable with respect to the SIM card 4 inserted from the first insertion direction Y1.

Next, the operation of the connector in the second embodiment is described. Referring to FIG. 6, two groups of three contacts 3 are arranged as a first group G1 and a second group G2, respectively. As shown in FIG. 6, the paired right and left resilient arms 3b and 3b are arranged roughly as a funnel shape when viewed in section. The SIM card 4 inserted from the first side 2a of the housing 2 slidably moves while making contact with the resilient arms 3b, and the inclined position of the SIM card 4 can be corrected.

For example, referring to FIG. 7, the SIM card 4 inserted from the first insertion direction Y1, with the right side inclined with respect to the connector cn2, slidably moves while making contact with the paired right and left resilient arms 3b and 3b, and its inclined position is corrected. On the other hand, referring to FIG. 8, the SIM card 4, inserted from the first insertion direction Y1 with the left side inclined with respect to the connector cn2, slidably moves while making contact with the paired right and left resilient arms 3b and 3b, and its inclined position is corrected.

Thus, the connector cn2 in the second embodiment allows self-correction having a self-alignment effect, wherein the inclined position of the SIM card 4 is corrected in accordance with insertion thereof. Moreover, the connector cn2 in the second embodiment includes no guiding parts, which are required in the related art, resulting in possible height reduction.

While the preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A connector, comprising:
    a plurality of cantilever contacts electrically connected to connection terminals of an IC card, each cantilever contact being composed of a plate-like contact, each cantilever contact including a stationary arm and a resilient arm having a contact point shaped in an arc, the stationary arm and the resilient arm being formed a substantially V-shape;
    a substantially rectangular plate-like housing that holds the cantilever contacts, the housing being integrally formed with the stationary arm so that the contact point projects from a first surface of the housing;
    wherein each of the cantilever contacts having a direction extending from a base end of the resilient arm to the contact point so as to obliquely intersect with a first side and a second side of the housing in a predetermined intersecting angle, being disposed parallel to each other;
    wherein the resilient arms are bendable such that the IC card is slidably inserted from one of the first side and the second side of the housing;
    wherein each cantilever contact includes a pair of jutting parts which project from the stationary arm, positioning symmetry with respect to a point each other and are integrally formed with the housing; and
    wherein each jutting part has a positioning hole which is engaged with a boss of the housing.

2. The connector according to claim 1, wherein the housing includes a compartment for accommodating part of each cantilever contact, adjacent compartments communicating with each other.

3. The connector according to claim 1, wherein the IC card comprises a SIM card.

4. The connector according to claim 1, wherein each cantilever contact includes a soldering part, at a tip of the stationary arm, for soldering to a printed circuit board, the soldering part being arranged to project from a second surface of the housing.

5. The connector according to claim 4, wherein the housing includes a compartment for accommodating part of each cantilever contact, adjacent compartments communicating with each other.

6. A connector, comprising:
    a plurality of cantilever contacts electrically connected to connection terminals of an IC card, each cantilever contact being composed of a plate-like contact, each cantilever contact including a stationary arm and a resilient arm having a contact point shaped in an arc, the stationary arm and the resilient arm being formed a substantially V-shape; and
    a substantially rectangular plate-like housing that holds the cantilever contacts, the housing being integrally formed with the stationary arm so that the contact point projects from a first surface of the housing;
    wherein a first group of cantilever contacts and a second group of cantilever contacts are arranged in a line symmetrical fashion,
    wherein each group of the cantilever contacts having a direction extending from a base end of the resilient arm to the contact, point so as to obliquely intersect with a first side and a second side of the housing in a predetermined intersecting angle,
    being disposed parallel to each other,
    wherein the resilient arms are bendable such that the IC card is slidably inserted from one of the first side and the second side of the housing,
    wherein each cantilever contact includes a pair of jutting parts which project from the stationary arm, positioning symmetry with respect to a point each other and are integrally formed with the housing, and
    wherein each jutting part has a positioning hole which is engaged with a boss of the housing.

7. The connector according to claim 6, wherein the housing includes a compartment for accommodating part of each cantilever contact, adjacent compartments communicating with each other.

8. The connector according to claim 6, wherein the IC card comprises a SIM card.

9. The connector according to claim 6, wherein each cantilever contact includes a soldering part, at a tip of the stationary arm, for soldering to a printed circuit board, the soldering part being arranged to project from a second surface of the housing.

10. The connector according to claim 9, wherein the housing includes a compartment for accommodating part of each cantilever contact, adjacent compartments communicating with each other.

* * * * *